US009025315B2

(12) United States Patent
Rustomji et al.

(10) Patent No.: US 9,025,315 B2
(45) Date of Patent: May 5, 2015

(54) ELECTROCHEMICAL ENERGY STORAGE DEVICE WITH FLEXIBLE METAL CURRENT COLLECTOR

(71) Applicant: Cooper Technologies Company, Houston, TX (US)

(72) Inventors: Cyrus Sam Rustomji, Walnut Creek, CA (US); Kyle Yun-Su Kim, Manteca, CA (US)

(73) Assignee: Cooper Technologies Company, Houston, TX (US)

( * ) Notice: Subject to any disclaimer, the term of this patent is extended or adjusted under 35 U.S.C. 154(b) by 149 days.

(21) Appl. No.: 13/787,048

(22) Filed: Mar. 6, 2013

(65) Prior Publication Data

US 2014/0254065 A1 Sep. 11, 2014

(51) Int. Cl.
| | |
|---|---|
| H01G 9/00 | (2006.01) |
| H01G 11/74 | (2013.01) |
| H01G 11/82 | (2013.01) |
| H01M 2/22 | (2006.01) |
| H01R 4/48 | (2006.01) |
| H01R 4/60 | (2006.01) |
| H01G 11/66 | (2013.01) |
| H01G 11/70 | (2013.01) |

(52) U.S. Cl.
CPC ............... *H01G 11/74* (2013.01); *H01G 11/82* (2013.01); *H01M 2/22* (2013.01); *H01R 4/4881* (2013.01); *H01R 4/60* (2013.01); *H01G 11/66* (2013.01); *H01G 11/70* (2013.01)

(58) Field of Classification Search
USPC ......... 361/502, 503, 504, 512, 516–519, 530, 361/535, 536, 540
See application file for complete search history.

(56) References Cited

U.S. PATENT DOCUMENTS

| | | | |
|---|---|---|---|
| 4,741,710 | A | 5/1988 | Hogan et al. |
| 6,449,139 | B1 | 9/2002 | Farahmandi et al. |
| 6,451,073 | B1 | 9/2002 | Farahmandi et al. |
| 6,631,074 | B2 | 10/2003 | Bendale et al. |
| 6,813,139 | B2 * | 11/2004 | Bendale et al. ............... 361/502 |
| 2008/0016664 | A1 | 1/2008 | Mitchell et al. |
| 2011/0318615 | A1 | 12/2011 | Chun et al. |

FOREIGN PATENT DOCUMENTS

| | | |
|---|---|---|
| EP | 0516523 A2 | 12/1992 |
| GB | 2217529 A | 10/1989 |

OTHER PUBLICATIONS

International Search Report and Written Opinion of International application No. PCT/US2014/017051; Apr. 8, 2014; 8 pages.

\* cited by examiner

*Primary Examiner* — Nguyen T Ha
(74) *Attorney, Agent, or Firm* — Armstrong Teasdale LLP

(57) ABSTRACT

Electrochemical energy storage devices such as electric double layer capacitors include a flexible metal contact current collector establishing electrical contact with a conductive housing at numerous contact points. The flexible current collector simplifies manufacturing of the device and avoids laser welding on the conductive housing. The manufacture devices are operable with a reduced direct current resistance by virtue of the flexible current collector.

30 Claims, 4 Drawing Sheets

ELECTROCHEMICAL ENERGY STORAGE DEVICE WITH FLEXIBLE METAL CURRENT COLLECTOR

BACKGROUND OF THE INVENTION

The field of the invention relates generally to electrochemical energy storage devices, and more specifically to electric double layer capacitor (EDLC) devices.

In electrical systems, secondary sources of current make it possible to accumulate, store and release electric power to an external electric circuit. Among these secondary sources are conventional batteries, conventional capacitors and electrochemical capacitors. Known devices of this kind include energy storage elements inside housings filled with electrolyte, and terminals for connecting the energy storage element to an electrical circuit. In the manufacture of such devices, establishing electrical connections to the energy storage elements can be problematic in some aspects, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
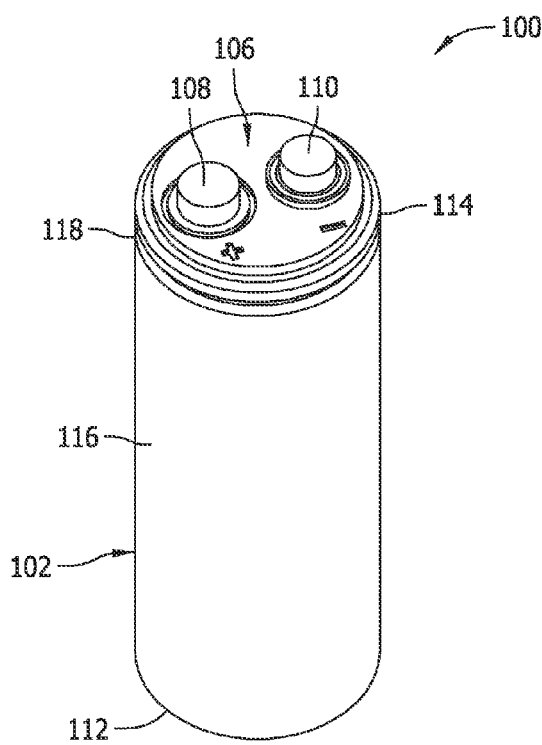
FIG. 1 is a perspective view of an exemplary embodiment of an electrochemical energy storage device.

Modern electrochemical energy storage devices, including but not limited to electric double layer capacitor (EDLC) devices, generally include a housing, sometimes referred to as a can, and at least one energy storage cell in the can. Terminals are also provided for connecting the energy storage cell of the device to external electrical circuitry.

Electrochemical double layer capacitors (EDLCs) utilize two high surface area electrodes and store energy in an electrostatic field between ions in an electrolyte solution and electrons on surface of the electrodes. Because of the electrostatic nature of the electrodes, EDLCs may be charged and discharged very quickly. Typically, the limiting factor in charge/discharge rates and efficiency of EDLCs is the electrical connections between the electrodes to the positive and negative terminals of the device. Not only are such electrical connections difficult to establish in the first place, they tend to result in relatively high resistance that tends to increase the direct current resistance (DCR) of the ELDC device. As higher DCR negatively impacts the performance of the ELDC device, reducing DCR of such devices is desired, but conventionally has been difficult to accomplish reliably and effectively.

In certain types of EDLC devices, the positive and negative electrodes of the storage cell are commonly wound into a layered cylindrical package, often referred to a jelly roll package, that also includes separator elements to provide one or more energy storage cells in a compact package. The jelly roll package is assembled with a housing, sometimes referred to as a can in the art, and the jelly roll is then impregnated with an electrolyte solution inside the housing for use. One or more current collectors are also provided to establish electrical connection between the positive and negative electrodes of the jelly roll and the positive and negative terminals of the device providing circuit connections to external electrical circuitry.

In one known EDLC construction, the positive or negative terminals of the ELDC device may be connected to tabs of connector plates that are, in turned joined to one or more of the respective positive or negative electrodes of the jelly roll. In EDLC devices of this kind, a plurality of connector tabs are typically joined by cold welding into the shape of the electrode or are directly cut into the shape of the electrode. One or more connector tabs may be provided for each respective positive or negative electrode in the jelly roll. The connector tabs are typically oriented in the same direction relative to the jelly roll to make connection to the positive or negative terminals of the EDLC device simple. Assembling the connector tabs in the proper shape and establishing connections to the electrodes is, however, a tedious task and can result in a relatively complicated and expensive construction of the EDLC device. This type of construction also tends to result in increased, rather than decreased, DCR for manufactured devices.

Alternatively, and in other known EDLC constructions, the jelly roll may include offset electrodes such that a bare metal surface is exposed on either end of the jelly roll to expose each respective end of an electrode. The exposed metal surface may be crushed to create a flat surface on the end of the jelly roll, which then can then be connected, via a known laser welding process in one example, to a flat collector plate. After being welded to the jelly roll, the connector plate is then commonly connected, via a known laser welding process in one example, to the can of the EDLC either through the can or through the back side of the can. The welding of the current collector to the can effectively makes the can one of the current collectors in the device. This construction is simpler in some aspects to the connector tab construction described above, and may provide devices having reduced DCR, but is not without its drawbacks.

Specifically, laser welding of the collector plate to the can be a difficult step in the manufacture to reliably complete. If the welding is deficient or defective, the collector plate may wholly or partially separate from the can and present reliability issues and performance variations in manufactured devices. Deficient or defective welding may also create a void in the constructed device through which air may get into the device or from which electrolyte may escape, also presenting reliability issues and performance variations in manufactured devices. Laser welding a current collector plate directly to the can also is also potentially problematic when the manufactured device is subject to vibration or shock in use, as an otherwise acceptable welded joint may be compromised by the shock and vibration while the device is operating. The device and related circuitry may be negatively compromised if and when this occurs.

Exemplary embodiments of electrochemical energy storage devices are described hereinbelow that overcome these and other disadvantages in the art. Specifically, exemplary embodiments of electrochemical energy storage devices, including but not necessarily limited to EDLC devices, are described that may be manufactured relatively simply in a cost effective manner, while avoiding welding of collector plate on the inside of the device to the outer can of the device and its accompanying drawbacks. Method aspects will be in part explicitly discussed and in part apparent from the description below. Also, while described in the context of an EDLC device, the concepts described below may be applied to other types of energy storage devices, including but not limited to battery devices.

Figure 2:
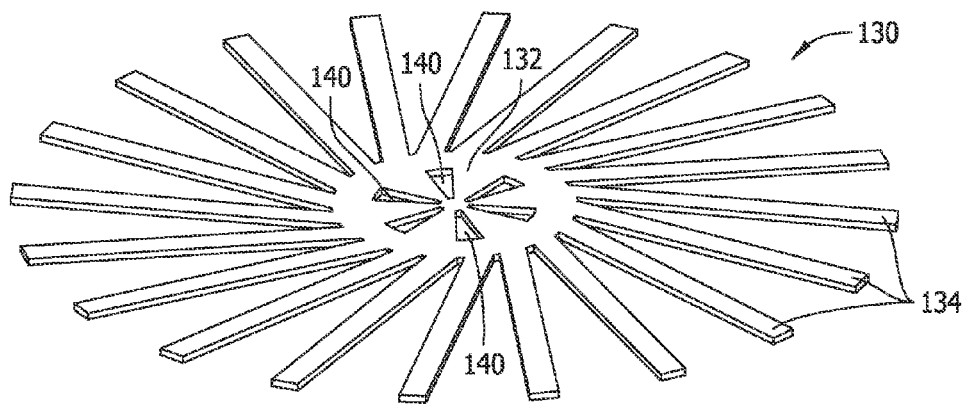
FIG. 2 is a perspective view of an exemplary embodiment of a flexible contact current collector for the electrochemical energy storage device shown in FIG. 1.
Figure 3:
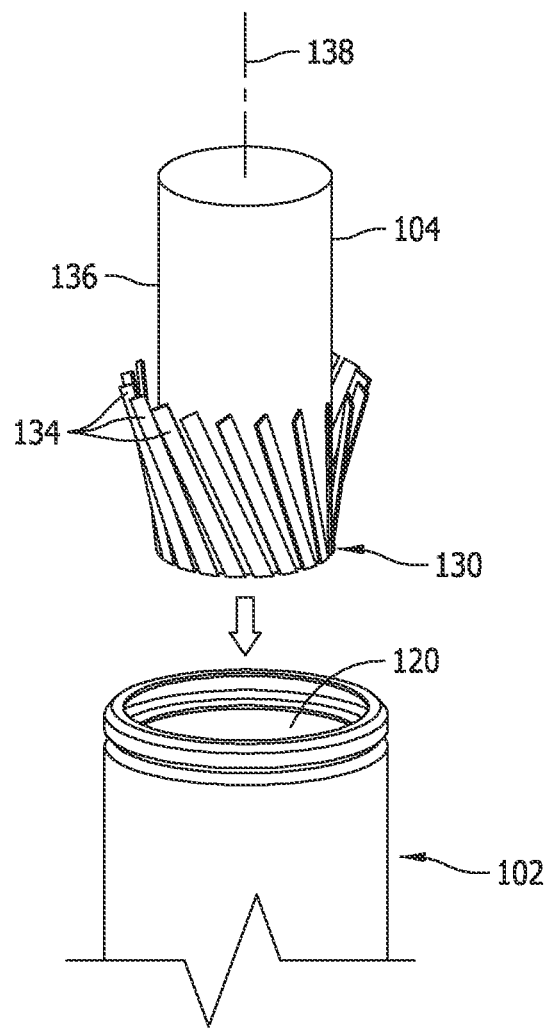
FIG. 3 is a perspective assembly view of the current collector shown in FIG. 1 coupled to a storage cell and being assembled to the housing of the electrochemical energy storage shown in FIG. 1.

FIGS. 1-3 collectively illustrate an exemplary embodiment of an electrochemical energy storage device 100 including a housing 102, and at least one energy storage element 104 (FIG. 3) in the housing. When the housing 102 is filled with an electrolyte to impregnate the storage cell 104, the storage cell 104 is operable to store and release electrical energy to and from an external electrical circuit. The device 100 also includes a cap 106 coupled to the housing 102 and the cap 106 includes first and second metal terminal lugs 108 and 110.

The housing 102 in the example depicted is a generally elongated cylindrical element having a first end 112, a second end 114 opposite the first end 112, and a cylindrical sidewall 116 extending between the first end 112 and the second end 114. The first end 112 is generally flat and planar, and the second end 114 is attached to the cap 106. The sidewall 116 between the first and second ends 112, 114 is generally round in cross section and has a constant diameter for most of its axial length measured between the first and second ends 112, 114. The housing 102 includes a restricted section 118 wherein the sidewall 116 is folded to facilitate connection of the cap 106 and sealing of the storage cell 104. The storage cell 104, as shown in FIG. 3, extends in a receptacle 120 in the housing 102 defined between the housing first end 112, the sidewall 116 and the restricted section 118. The housing 102 in exemplary embodiments may be formed from metal, such as steel or aluminum in exemplary embodiments, using known techniques. The housing 102 is often referred to as a can. In contemplated embodiments, the can 102 is fabricated from metal, including but not limited to steel or aluminum, in a known manner.

In one contemplated embodiment, the device 100 is an EDLC device, sometimes referred to as a supercapacitor that has, for example, specific capacitance of greater than 100 F/g, as opposed to conventional capacitors with specific capacitance on the order of only several F/g. Supercapacitors are used in a variety of different applications such as memory backup to bridge short power interruptions, battery management applications to improve the current handling of a battery, or to provide a current boost on high load demands.

The at least one storage cell 104 of the ELDC device 100 is situated internal to the receptacle 120 defined by the housing 102. As the device 100 is manufactured, the storage cell 104 is filled with an electrolyte and the storage cell 104 includes at least one positive electrode (cathode), at least one negative electrode (anode), and a separator such as a membrane that separates the anode space from the cathode space. In a contemplated embodiment, the jelly roll storage cell 104 includes offset electrodes that may be crushed to create a flat surface on end thereof.

The storage cell 104 including the positive and negative electrodes may be provided as a generally tubular or cylindrical jelly roll package having multiple layers that define a single cell or multiple cells. It is recognized that a jelly roll may alternatively be provided in other shapes and configurations, including but not limited to folded configurations and accordion shapes if desired. A current collector 130 FIGS. 2 and 3 may be provided to the jelly roll storage cell to interconnect the anode(s) and the electrodes(s) of the storage cell(s) 104 with the housing 102. The current collector 130 mechanically and electrically engages the bottom end 112 and a portion of the side wall 116 as described below to reliably establish electrical connection to the housing 102 without having to create a laser welded joint, and also while maintaining low electrical resistance and reduced DCR relative to conventional EDLC device constructions.

The metal terminal lugs 108, 110 of the cap 106 provide respective electrical connection between the anode(s) of the storage cell(s) 104 and the cathode(s) of the energy storage cell(s) and external electrical circuitry. It is recognized, however, that various other types and configurations of circuit connection terminals are known and likewise may be utilized in other embodiments.

The construction and operation of the storage cell 104 in the housing 102 of the EDLC device 100 is well understood and will not be detailed further herein.

Referring now to FIGS. 2 and 3, an exemplary current collector 130 is illustrated that provides substantial benefits to the construction and manufacture of the device 100. The current collector 130 is fabricated from a flexible metal material and as shown in FIG. 2 includes a central body 132 and a plurality of elongated flexible connector elements 134 extending outwardly from the body 132.

In the example shown, the body 132 is generally round and the connector elements 134 extend outwardly from an outer periphery of the body 132 as elongated rectangular strips of material. The body 132 has a diameter about equal to a lower end of the jelly roll 104 as shown in FIG. 3, and the connector elements 134 may be folded or bent upwardly from the body 102 from a first position coplanar with the body 130 to a second position shown in FIG. 3 wherein the connector elements 134 are bent out of the plane of the body 130 and extend alongside, but at an angle to, the outer side surface 106 of the jelly roll 104.

The connector elements 134 as shown in FIGS. 2 and 3 extend obliquely from the outer periphery of the body 130, and in particular do not extend radially or perpendicularly from the circular outer periphery of the body 130. Thus, as shown in FIG. 3, when the collector plate 130 is assembled to the jelly roll 104 and the connector elements 134 are bent out of the plane of the body 132, the connector elements extend at a compound oblique angle relative to the longitudinal axis 138 of the jelly roll 104. That is, the connector elements 134 extend at a first oblique angle relative to the outer surface 136 in a vertical direction and also at a second oblique angle in a horizontal direction as shown in FIG. 3. As such, and when the connector elements 134 are bent, the connectors elements 134 extend alongside the outer surface 136 of the jelly roll at gradually increasing vertical and horizontal distances from the outer surface 136 from the proximal end of each connector element 134 where it connects to the periphery of the body 132 to the distal end of each connector element 134. While the exemplary embodiment shown includes twenty connector elements 134, it is contemplated that greater or fewer connector elements 134 may be used in other embodiments.

The current collector 130, and specifically the body 132 of the current collector 130, may be laser welded to the flat surface of the jelly roll 104 having the crushed offset electrodes as shown in FIG. 3. The connector elements 134 may be bent out of the plane of the body 132 before or after the laser welding to the flat surface of the jelly roll is accomplished. Regardless, and as shown in FIG. 3, the jelly roll 104 including the current collector 130 may be inserted into the housing 102 as an assembly. Upon insertion, ideally there will be a tight fit between the inner diameter of the housing 102 and the outer surfaces of the connector elements 134. The body 132 of the current collector 130 is placed in surface engagement or contact with the end 122 of the housing 112, with the connector elements 134 placed in surface engagement with or contact the inner diameter of the housing sidewall 116. The multiple points of contact via the connector elements 134 and the body 132 establish electrical connection between the housing 102 and the jelly roll 104 with a reduced electrical resistance. Because the connector elements 134 are angled as described, electrical contact with the housing 102 is facilitated via a plurality of thin, sharp edges of the connector elements 134 with a relatively low electrical resistance, and reduced DCR of manufactured components 100.

Another benefit of the collector 130 is that the conductor elements 134 provide a more rigid support between the jelly roll 104 and the device housing 102. The connector elements 134 firmly hold the jelly roll 104 in place even in operating environments prone to shock and vibration. The added structural support of the connector element 134 prevents damage to the jelly roll 104 that may otherwise occur in certain operating environments, or that may compromise the laser welded joint between the jelly roll 104 and the collector body 132. Further, good electrical contact between the housing 102 and the current collector 130 is practically guaranteed even in the presence of strong vibrations because the flexibility of the connector elements allows them connector elements 134 to move relative to the housing 102 without losing electrical contact with the housing 102.

The device 100, by virtue of the collector 130, facilitates the manufacture of a highly reliable EDLC device 100 using a relatively small number of components, as well as reduces the number of laser welding steps needed to manufacture the device 100, which in turn reduces cost and scrap from deficiently welded devices or reliability issues of manufactured devices in use. As such, the device 100 offers both manufacturing and performance benefits compared to conventional EDLC device construction.

As further shown in FIG. 3, the collector body 132 may be formed with one or more apertures or openings 140 formed through the opposing major surfaces of the body 132. The openings 140 facilitate a flow of electrolyte in the jelly roll 104 as the device 100 is manufactured. In the illustrated embodiment, six openings 140 are formed as a pattern in the body 132, each of the apertures 140 having a triangular wedge shape extending radially outward from the center of the round body 132. It is recognized, however, that greater of fewer numbers of openings 140 may likewise be formed in the body 132, and the apertures 140 may have different shapes and/or may be arranged in a pattern different from that shown in FIG. 2. It is also contemplated that in some embodiments the openings 140 may be considered optional and may be omitted.

The collector 130 may be formed and fabricated from a thin, planar sheet of conductive metal, including but not necessarily limited to aluminum or steel, in a known manner using punching techniques or other techniques known in the art. Multiple such collectors 130 may be fabricated from a large sheet of conductive material. The collectors 130 may then be provided for assembly with the jelly roll 104 and housing 102 as described to manufacture the device 100.

While an exemplary geometry of the current collector 130 is illustrated, many alternative geometries are possible with at least some of the benefits described being realized.

Figure 4:
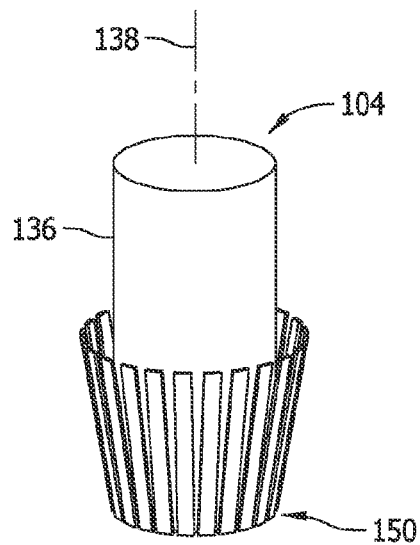
FIG. 4 is a perspective view of another exemplary embodiment of a current collector and storage cell assembly for the electrochemical energy storage device shown in FIG. 1.
Figure 5:
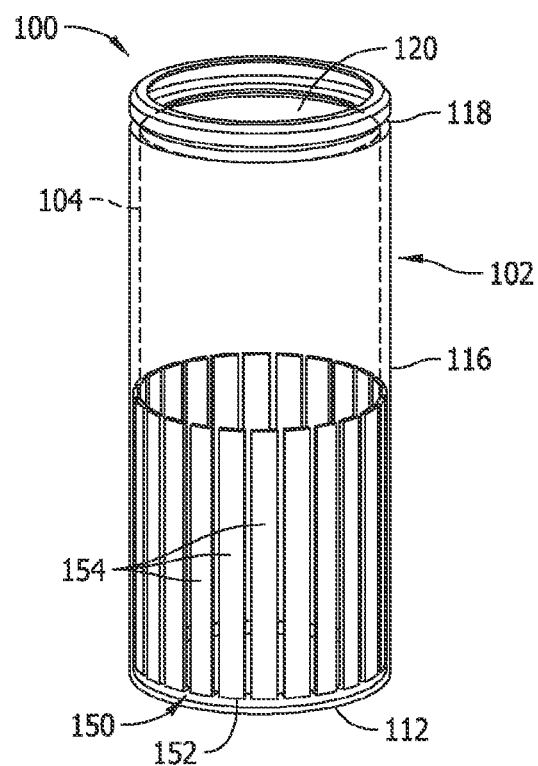
FIG. 5 shows the assembly of FIG. 4 installed to a housing of the electrochemical energy storage device shown in FIG. 1.
Figure 6:
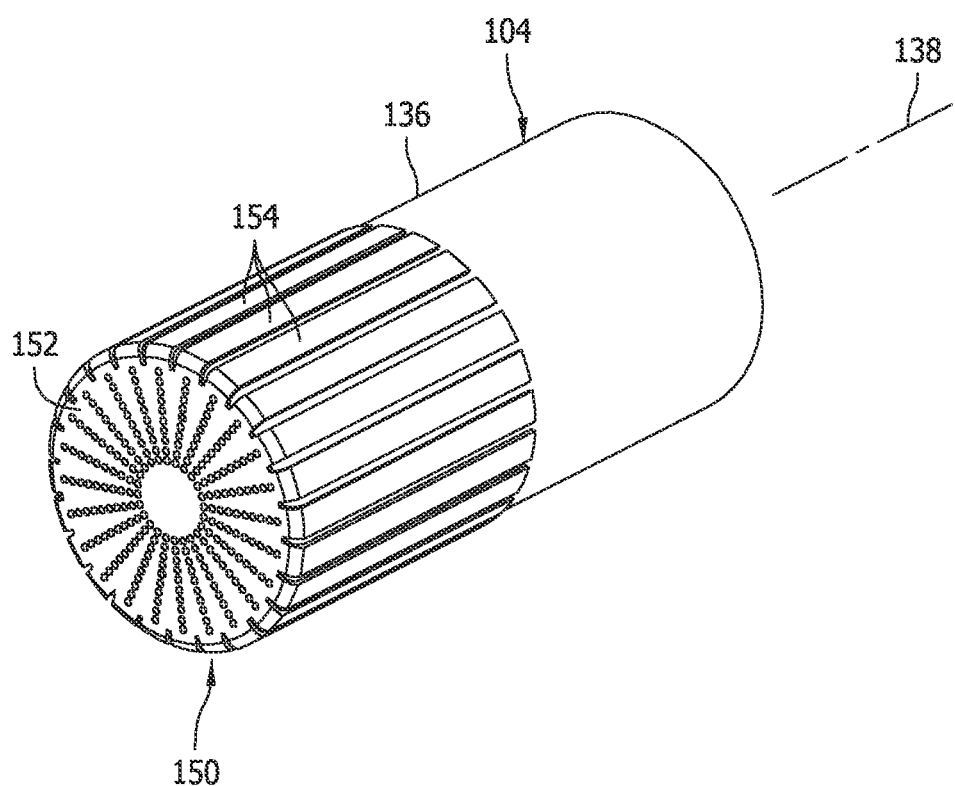
FIG. 6 is an end perspective view of the assembly shown in FIG. 5 with the housing removed.

FIGS. 4-6 illustrate another embodiment of a flexible current collector 150 that may be used to manufacture the device 100. The collector 150, as shown in FIGS. 4-6 includes a body 152 and a plurality of collector elements 154 extending from the body 152. The body 152 may be welded to the flat end of the jelly roll 104 including the crushed electrodes, and the connector elements 154 may be bent out of the plane of the body 152 to extend alongside the outer surface 136 of the jelly roll 104.

Unlike the connector elements 134 (FIGS. 2 and 3), the connector elements 154 extend alongside the outer surface 136 of the jelly roll 104 in manner parallel to the longitudinal axis 138 of the jelly roll 134 when the collector 150 is welded to the jelly roll 140 and the collector/jelly roll assembly is inserted into the housing 102. FIG. 5 illustrates the collector elements 154 extending axially in the housing 102 in a parallel manner to the longitudinal axis of the housing 102. Before the collector elements 134 are shaped to extend out of the plane of the body 152, the collector elements 154 extend essentially radially from the outer periphery of the round body 152. In the installed position as shown in FIG. 5, the collector elements 154 extend substantially perpendicular to the collector body 152.

As shown in FIG. 6, a pattern of apertures may be formed through the collector body 152. While one such pattern is illustrated, others may be used in different embodiments. In some embodiments, the aperture pattern may be considered optional and may be omitted.

Except for the differences noted, the benefits of the collector 150 are similar to the benefits of the collector 130.

In contemplated embodiments the collectors 130, 150 in the device 100 are used to complete electrical connection with the negative terminal 110 of the device 100. In other embodiments, the collectors 130, 150 may establish electrical connection to the positive terminal 108.

As a demonstration of the performance advantages of the device 100 described, six EDLC devices constructed using the a flexible electrical contact current collector 130 or 150 associated with a negative terminal of a jelly roll. The current collector was laser welded to the jelly roll and then pressed into the can. The current collectors utilized included a body having about a 25 mm diameter, with collector elements extending outwardly from the outer periphery of the body for about an additional 20 mm to contact the interior sidewall of the can when inserted therein.

Once constructed, the energy storage cells in the jelly rolls were charged to a full voltage (e.g., about 2.7 V in these examples) for a predetermined time (e.g., about 1 hour in these examples) and then discharged at about 20 Amps. DCR readings were taken upon discharge. Capacitance was measured between 80 and 40% full voltage. The results for devices having the flexible contact current collector as described (referenced as Current Invention) are tabulated below in Table 1 with comparison data for conventionally constructed EDLC devices using collector elements welded to the can of the device (referenced as Prior Art).

TABLE 1

| | Current Invention | | Prior Art | |
| --- | --- | --- | --- | --- |
| Cell # | DCR (mOhm) | Capacitance (F) | DCR (mOhm) | Capacitance (F) |
| 1 | 1.04 | 369 | 1.59 | 390 |
| 2 | 1.24 | 366 | 1.83 | 373 |
| 3 | 1.21 | 358 | 1.68 | 393 |
| 4 | 0.97 | 368 | 1.93 | 374 |

TABLE 1-continued

| | Current Invention | | Prior Art | |
|---|---|---|---|---|
| Cell # | DCR (mOhm) | Capacitance (F) | DCR (mOhm) | Capacitance (F) |
| 5 | 1.02 | 388 | 1.59 | 391 |
| 6 | 0.94 | 367 | — | — |
| Avg | 1.07 | 369.33 | 1.724 | 384.2 |

One can see from Table 1 that, the current invention is superior to the prior art. A decrease in DCR of about 38% is demonstrated for the devices of the current invention, while providing comparable capacitance to the conventional EDLC devices of the prior art.

The benefits and advantages of the inventive concepts are now believed to be evident in view of the exemplary embodiments disclosed.

An embodiment of an electrochemical energy storage device has been disclosed. The electrochemical energy storage device includes a housing, at least one energy storage element in the housing, and a flexible contact current collector comprising a body and a plurality of connector elements extending outward from said body. The body establishes electrical contact with the at least one energy storage element and the plurality of connector elements establish electrical contact with the housing.

Optionally the energy storage element may include a jelly roll, and the jelly roll may have a flat end. The body of the flexible contact current collector may be welded to the flat end. The body may also have an outer periphery and the plurality of connector elements may extend outwardly from the outer periphery. The connector elements may be angled.

The energy storage element may include a side surface, and the plurality of connector elements may extend alongside the side surface. The energy storage element may have a longitudinal axis, and the plurality of connector elements may extend parallel to the longitudinal axis. Alternatively, the plurality of connector elements may extend obliquely to the longitudinal axis. The connector elements extend as generally elongated rectangular strips. The body of the flexible contact current collector may be formed with at least one aperture.

The housing may include a metal can fabricated from one of a steel and aluminum. A cap may be attached to the housing. A terminal may be provided for connecting the storage cell to an external electric circuit, and the flexible contact current collector may complete a connection to the terminal. The terminal may be a negative terminal of the device. The device may be an electric double layer capacitor (EDLC) device.

Another embodiment of an electrochemical energy storage device has been disclosed. The device includes a housing having a first end, a second end and a sidewall between the first and second end. At least one energy storage element is in the housing and is internal to the sidewall. A flexible contact current collector includes a body and a plurality of connector elements extending outward from said body, with the body establishing electrical contact with the at least one energy storage element and the plurality of connector elements establishing electrical contact with the sidewall of the housing.

Optionally, the energy storage element may include a jelly roll. The housing may include a metal can. The jelly roll may include a flat end, with the body of the collector element being attached to the flat end. The body of the flexible contact current collector may be welded to the flat end. The body may have an outer periphery and the plurality of connector elements may extend outwardly from the outer periphery. The energy storage element may have a side surface, and the plurality of connector elements may extend alongside the side surface. The energy storage element may have a longitudinal axis, and the plurality of connector elements may extend parallel to the longitudinal axis or may extend obliquely to the longitudinal axis. The connector elements may extend as generally elongated rectangular strips. The body may be formed with at least one aperture, and the device is an electric double layer capacitor (EDLC) device.

Another embodiment of an electrochemical energy storage device has been disclosed including: a metal housing having a first end, a second end and a sidewall between the first and second end, the first end and the sidewall collectively defining a receptacle; at least one energy storage element in the receptacle, the energy storage element comprising a jelly roll having a flat end; a flexible contact current collector attached to the flat end and establishing numerous points of electrical contact with the sidewall of the housing without a welded joint between the current collector and the housing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical energy storage device comprising:
   a housing;
   at least one energy storage element in the housing; and
   a flexible contact current collector comprising a body and a plurality of connector elements extending outward from the body, the body establishing electrical contact with the at least one energy storage element and the plurality of connector elements establishing electrical contact with the housing.

2. The electrochemical energy storage device of claim 1, wherein the at least one energy storage element comprises a jelly roll.

3. The electrochemical energy storage device of claim 2, wherein the jelly roll has a flat end.

4. The electrochemical energy storage device of claim 3, wherein the body of the flexible contact current collector is welded to the flat end.

5. The electrochemical energy storage device of claim 1, wherein the body has an outer periphery and the plurality of connector elements extend outwardly from the outer periphery.

6. The electrochemical energy storage device of claim 5, wherein the plurality of connector elements are angled.

7. The electrochemical energy storage device of claim 1, wherein the at least one energy storage element further has a side surface, and the plurality of connector elements extend alongside the side surface.

8. The electrochemical energy storage device of claim 7, wherein the at least one energy storage element has a longitudinal axis, and the plurality of connector elements extend parallel to the longitudinal axis.

9. The electrochemical energy storage device of claim 7, wherein the at least one energy storage element has a longitudinal axis, and the plurality of connector elements extend obliquely to the longitudinal axis.

10. The electrochemical energy storage device of claim 7, wherein the plurality of connector elements extend as generally elongated rectangular strips.

11. The electrochemical energy storage device of claim 1, wherein the body is formed with at least one aperture.

12. The electrochemical energy storage device of claim 1, wherein the housing comprises a metal can fabricated from one of a steel and aluminum.

13. The electrochemical energy storage device of claim 1, further comprising a cap attached to the housing.

14. The electrochemical energy storage device of claim 1, further comprising a terminal for connecting the storage cell to an external electric circuit.

15. The electrochemical energy storage device of claim 14, wherein the flexible contact current collector completes a connection to the terminal.

16. The electrochemical energy storage device of claim 14, wherein the terminal is a negative terminal of the device.

17. The electrochemical energy storage device of claim 1, wherein the device is an electric double layer capacitor (EDLC) device.

18. An electrochemical energy storage device comprising:
a housing having a first end, a second end and a sidewall between the first and second end;
at least one energy storage element in the housing and internal to the sidewall; and
a flexible contact current collector comprising a body and a plurality of connector elements extending outward from the body, the body establishing electrical contact with the at least one energy storage element and the plurality of connector elements establishing electrical contact with the sidewall of the housing.

19. The electrochemical energy storage device of claim 18, wherein the at least one energy storage element comprises a jelly roll.

20. The electrochemical energy storage device of claim 18, wherein the housing comprises a metal can.

21. The electrochemical energy storage device of claim 18, wherein the jelly roll has a flat end, the body of the flexible contact current collector element being attached to the flat end.

22. The electrochemical energy storage device of claim 21, wherein the body of the flexible contact current collector is welded to the flat end.

23. The electrochemical energy storage device of claim 18, wherein the body has an outer periphery and the plurality of connector elements extend outwardly from the outer periphery.

24. The electrochemical energy storage device of claim 18, wherein the at least one energy storage element further has a side surface, and the plurality of connector elements extend alongside the side surface.

25. The electrochemical energy storage device of claim 24, wherein the at least one energy storage element has a longitudinal axis, and the plurality of connector elements extend parallel to the longitudinal axis.

26. The electrochemical energy storage device of claim 24, wherein the at least one energy storage element has a longitudinal axis, and the plurality of connector elements extend obliquely to the longitudinal axis.

27. The electrochemical energy storage device of claim 18, wherein the plurality of connector elements extend as generally elongated rectangular strips.

28. The electrochemical energy storage device of claim 18, wherein the body is formed with at least one aperture.

29. The electrochemical energy storage device of claim 18, wherein the device is an electric double layer capacitor (EDLC) device.

30. An electrochemical energy storage device comprising:
a metal housing having a first end, a second end and a sidewall between the first and second end, the first end and the sidewall collectively defining a receptacle;
at least one energy storage element in the receptacle, the at least one energy storage element comprising a jelly roll having a flat end;
a flexible contact current collector attached to the flat end and establishing numerous points of electrical contact with the sidewall of the housing without a welded joint between the current collector and the housing.

* * * * *